(12) United States Patent
Perrier

(10) Patent No.: US 7,844,049 B2
(45) Date of Patent: Nov. 30, 2010

(54) ASSEMBLY AND A TELECOMMUNICATIONS MODULE FOR USE THEREIN

(75) Inventor: Gaetan Perrier, Saint Jorioz (FR)

(73) Assignee: 3M Innovative Properties Company, St. Paul, MN (US)

( * ) Notice: Subject to any disclaimer, the term of this patent is extended or adjusted under 35 U.S.C. 154(b) by 482 days.

(21) Appl. No.: 10/598,929

(22) PCT Filed: Feb. 3, 2005

(86) PCT No.: PCT/US2005/003289

§ 371 (c)(1),
(2), (4) Date: May 29, 2008

(87) PCT Pub. No.: WO2005/094090

PCT Pub. Date: Oct. 6, 2005

(65) Prior Publication Data

US 2008/0240162 A1    Oct. 2, 2008

(51) Int. Cl.
*H04M 1/00*    (2006.01)

(52) U.S. Cl. .................. 379/413.04; 361/823; 439/709

(58) Field of Classification Search ........... 379/325–30, 379/397, 413; 361/822, 823; 439/709–722
See application file for complete search history.

(56) References Cited

U.S. PATENT DOCUMENTS

| | | | |
|---|---|---|---|
| 5,175,662 A | 12/1992 | DeBalko et al. | |
| 5,800,187 A * | 9/1998 | Vermon et al. | 439/92 |
| 5,967,826 A | 10/1999 | Letailleur | |
| 7,059,864 B2 | 6/2006 | Matthies et al. | |
| 2002/0118820 A1* | 8/2002 | Sinclair et al. | 379/399.01 |
| 2003/0002641 A1* | 1/2003 | Schmokel | 379/166 |
| 2005/0063531 A1* | 3/2005 | Arias | 379/325 |

FOREIGN PATENT DOCUMENTS

| | | |
|---|---|---|
| EP | 0 522 540 A1 | 1/1993 |
| EP | 0 909 102 A2 | 4/1999 |
| FR | 2 770 773 | 4/1999 |
| WO | WO 02/076109 A2 | 9/2002 |
| WO | WO 2004/032533 | 4/2004 |

* cited by examiner

*Primary Examiner*—Walter F Briney, III
(74) *Attorney, Agent, or Firm*—Janet A. Kling

(57) ABSTRACT

An assembly (10) of three telecommunications modules (12, 14, 16) each having an equal number of contacts for connecting wires (18, 20, 28) therewith, comprises splitter circuits (30', 30"), the number of splitter circuits (30', 30") being equal to half of the number of contacts of each module (12, 14, 16), one third of the contacts (24, 74) of the assembly (10) being adapted to transmit a line signal, one third of the contacts (22, 72) of the assembly (10) being adapted to transmit a POTS signal, and one third of the contacts (26) of the assembly (10) being adapted to transmit a DSLAM-signal. A module, particularly for use within an assembly, is open at a side other than a front side, at which contacts are exposed, so as to allow at least one splitter circuit (30', 30") to be at least partially inserted into the module.

15 Claims, 2 Drawing Sheets

ASSEMBLY AND A TELECOMMUNICATIONS MODULE FOR USE THEREIN

TECHNICAL FIELD

The invention relates to an assembly of three telecommunications modules as well as a telecommunications module, particularly for use within an assembly.

BACKGROUND

In the field of telecommunications, numerous customers are connected with the switch of a telecommunications company via telecommunications lines. The customers can also be called subscribers. The switch is also called an exchange.

Between the subscriber and the switch, sections of the telecommunications lines are connected with telecommunications modules. The telecommunications modules establish an electrical connection between a wire which is attached to the telecommunications module at a first side, and another wire which is attached to the telecommunications module at a second side. Plural telecommunications modules can be put together at a distribution point, such as a main distribution frame, an intermediate distribution frame, an outside cabinet or a distribution point located, for example, in an office building or on a particular floor of an office building. To allow flexible wiring, some telecommunications lines are connected with first telecommunications modules in a manner to constitute a permanent connection. Flexibility is realized by so-called jumpers, which flexibly connect contacts of the first telecommunications module with contacts of a second telecommunications module. These jumpers can be changed when a person moves within an office building to provide a different telephone (i.e. a different telephone line) with a certain telephone number, which the relocated person intends to keep.

Recently, ADSL-technology has spread widely in the field of telecommunications. This technology allows at least two different signals to be transmitted on a single line. This is achieved by transmitting the different signals at different frequencies along the same line. The signals are combined at a particular point in the telecommunications line and split at another point. In particular, at the subscriber side, voice and data signals, which are separate, are combined and sent to the central office via the same line. In the central office the combined signal is split. For the transmission of voice and data signals to the subscriber, separate voice and data signals are combined at the central office, sent to the subscriber and split at the subscriber side. After splitting the signal, the so-called POTS-signal (plain old telephone service) can be used to transmit voice signals. The remaining part of the split signal can be used to transmit data, for example. So-called splitters, which are used to split or combine the signal, can generally be arranged at any distribution point. In this context, a POTS wire or POTS jumper indicates a wire, which is connected with an exchange of the telecommunications company. Furthermore, a line connection indicates a wire, which leads to the subscriber or customer. Finally, as discussed in more detail below, a DSLAM-wire means a wire which is connected with a DSLAM and thus, can, for example, transmit data. A DSLAM (Digital Subscriber Line Access Multiplexer) processes the data signal.

WO 2002/076109 discloses a splitter being integrated in a main distribution frame. An integrated assembly comprises three arrays of contacts, a first array being connected with a line, a second array being connected with POTS and a third array being connected with a DSLAM. The contacts of the assembly are connected with splitter circuits to split a signal, which is transmitted by the line, into a POTS and a DSLAM signal. Whereas this known assembly provides increased versatility due to an additional array of contacts, this additional array of contacts might not be necessary in all cases so that the density, which is achieved by the known assembly, can be improved.

SUMMARY OF THE INVENTION

The invention provides an assembly in the field of telecommunications which achieves a high density in connection with telecommunications lines carrying line, POTS and DSLAM signals, which are connected with contacts of telecommunications modules. Furthermore, a module suitable for such an assembly is provided.

The assembly comprises three telecommunications modules. The modules can have the same or a similar structure. The modules can be "standard modules", as far as appropriate with the modifications described hereinafter, as they are known to those skilled in the related field. In particular, the telecommunications modules can be strip-type-modules with a wide and shallow front side at which contacts for connecting wires therewith are exposed. Such a module is, for example, commercially available from Quante, 3M Telecommunications, of Neuss, Germany under the designation SID. The assembly comprises, in its basic configuration, three telecommunications modules. It is, however, evident that any number of assemblies can be provided so that, preferably, an even multiple of three gives the number of telecommunications modules which are present.

The telecommunications modules of the assembly have an equal number of contacts for connecting wires with the mentioned contacts. The contacts can be IDCs (insulation displacement contacts), wire wrap contacts or any other type of contacts.

Furthermore, several contacts can be grouped together to constitute a connector, to which a complementary connector having the same number of contacts grouped together, is connectable. The fact that the modules of the assembly have an equal number of contacts corresponds to the aspect that three modules of the same or of a similar configuration can be used in the assembly.

The assembly further comprises splitter circuits. As will be apparent to those skilled in the field, splitter circuits comprise suitable filters, such as low pass and high pass filters, to split the combined signal as described above. Furthermore, although reference has been made to "splitting" a signal, the basic requirements are essentially identical at that point of the telecommunications system where the POTS and DSLAM signals are combined with each other so as to be fed to the line. Thus, a reference to a "splitter" may be understood in appropriate circumstances to be a reference to what could be called a signal "combiner."

As described in more detail below, one-third of the contacts of the assembly are adapted to transmit a DSLAM-signal from the splitter to the DSLAM and vice versa. This signal is provided by the splitter circuit which splits, as described above, the line signal, which typically comprises a POTS or voice signal, on the one hand, and a data, i.e. DSLAM-signal, on the other hand, into their respective frequency bands. Thus, each splitter circuit provides a DSLAM-signal, which is transmitted via a pair of wires, so that a pair of contacts of the assembly is used to transmit this signal. Thus, the number of splitter circuits corresponds to half of the number of contacts of each module, as one third of the contacts of the assembly are adapted to transmit the DSLAM-signal, and two contacts are required for transmitting each signal. The assembly can, particularly in an initial or intermediate state, comprise less splitter circuits than half of the number of contacts of each module. In particular, the assembly can be built up step by step by adding splitter circuits as required. Thus, the advantages of the invention can also be used if the assembly of three telecommunications modules is prepared with the contacts thereof being adapted to transmit various signals as mentioned above. In this case, the assembly can be adapted to receive and/or accommodate the splitter circuits in a number as described above to provide the mentioned contacts with the signals to be transmitted.

The splitter circuits, as described above, comprise an electrical circuit which splits or combines a signal. This signal is transmitted via contacts of the splitter circuit, which are connected with contacts of the assembly. The contacts of the assembly, which receive, for example a DSLAM-signal from the splitter, are, therefore, adapted to transmit the DSLAM-signal. Correspondingly, a pair of wires, which leads to the DSLAM will be connected with these contacts of the assembly. Corresponding considerations apply to those contacts which are described to be adapted to transmit the line and the POTS signals.

The assembly described herein provides a high density telecommunications assembly, as preferred, and as described above, in a final state, in which all connections are made and all splitters, which the assembly is adapted to receive, are present, each and every contact of the assembly is used to connect wires therewith. This includes variations and modifications, in which there are further contacts, which are left unused or are used for other purposes, such as connecting drain or ground wires. The above-described high density is achieved by making efficient use of those contacts of the assembly, which are adapted to transmit the various signals as described above and are, for this purpose, connectable with a splitter. In contrast, previous modules having an even number of contacts were not configured to be used in the manner described above, so that at least some contacts remained free of wires, which reduced the connection density. As an example, three modules with sixteen pairs of contacts each can be used to serve sixteen subscribers. This is, as described above, achieved by an assembly of three telecommunications modules having the same or at least a similar structure. In particular, with a currently preferred type of telecommunications module being used, a pitch of 45 mm can be realized, meaning that with the assembly having a height of 45 mm, sixteen voice/DSL subscribers can be served.

Generally, the assembly is flexible with regard to the particular location of the contacts which are adapted to transit the line signal, the POTS signal and the DSLAM signal. However, one specific telecommunications module may contain only contacts that are adapted to transmit the DSLAM-signal. In other words, one of the three telecommunications modules of the assembly is used as a kind of specific DSLAM-module.

In this case, this DSLAM-module can be arranged between the two remaining modules. This provides a particularly logical and clear structure in comparison with conventional assemblies as half of the contacts of the DSLAM-module, (e.g. a first array of contacts) can be associated with the contacts of each adjacent module. In particular, the adjacent module can carry those contacts which are adapted to transmit both the line and the POTS signals of a first group of subscribers. The adjacent row of contacts of the DSLAM-module can be adapted to transmit the DSLAM signal of those subscribers. This is described below with reference to FIGS. 1 and 2.

Correspondingly, in the assembly described herein, a first half of contacts of at least one module can be adapted to transmit line-signals, and the remaining, second half of the contacts of this module can be adapted to transmit the POTS-signals.

The splitter circuits can be integrated in an assembly which has plural splitter circuits, possibly all of the splitter circuits which are required for the assembly described above. However, the splitter circuits can also be provided separate from each other, such that one particular circuit has three pairs of two contacts, in total six contacts, each of which is connected with a suitable contact of the assembly. Thus, such a splitter circuit, which can be provided in a suitable integrated, separate component, such as a splitter block, can be called a single line splitter. With this measure, only that splitter, which is connected with lines of one particular subscriber, can be removed from the assembly or added thereto, in case of problems arising, or in case a subscriber, who previously had only POTS service, wishes to use ADSL-service in addition.

The assembly can, furthermore, comprise a carrier system, with the telecommunications modules of the assembly being attachable to the carrier. The attachment systems of the modules and the carrier essentially cooperate to allow releasable mounting of the modules to the carrier. These attachment systems can particularly be adapted to allow swiveling of the module and/or the assembly of modules with regard to the carrier. As described in more detail below, this allows an easy access to the rear side of the assembly. In particular, the splitter circuits can be releasable and located at a rear side of the assembly, which leads to the following advantages. At the front side of the modules, the contacts thereof, which are adapted to connect wires therewith, are exposed. In certain situations, these wires need to be manipulated, for example to be taken out and connected with other contacts. Furthermore, it might be necessary to insert test plugs or protection components, such as over-voltage or over-current protectors from the front side. These processes are facilitated by the described structure, wherein the rear side is accessible by swiveling the modules of the assembly to allow the insertion of other components, such as the splitter circuit, from the rear side.

In particular, the carrier can be at least partially open at a side thereof opposite the attachment system of the carrier. This provides further advantages with regard to components such as splitter circuits being inserted into telecommunications modules from a rear side thereof. As will be apparent, when a module is swiveled about the attachment location at one side thereof, any components which are present at the rear side, in particular at a side opposite of the attachment location, will, when the module is swiveled about the attachment system, move in a circle which extends further from the attachment location than the initial position of the component at the rear side. Thus, a carrier which is at least partially open at a side opposite the attachment location allows this movement of any component which is present at a rear side of the module. Thus, the use of the rear side for inserting components such as splitter circuits will be facilitated. Furthermore, the carrier described above can be adapted to carry the assembly of three modules, but the carrier can also be adapted to carry any desired number of such assemblies and/or single modules. It should be mentioned that such a carrier, i.e. having an attachment system for a swivelable connection on one side and being at least partially open at the opposite side, is as such considered novel and subject matter of the present disclosure with or without a combination with the assembly as described above. In particular, the described carrier as such leads to advantages also with general telecommunications modules, i.e. not necessarily modules constituting an assembly as described above. The carrier can generally be described to be asymmetric.

The assembly can further comprise an adapter, which can be provided at the at least partially open side. The adapter can allow attachment of the module to the carrier on the side, which is opposite the attachment system, which allows the swivelable attachment. Furthermore, the adapter can be configured to connect the three modules of the assembly and/or to connect the assembly with the carrier. The adapter can be attachable to the module by any suitable system, such as latch hooks. The same considerations apply to the interaction between the adapter and the carrier.

The invention also provides a telecommunications module, particular for use within an assembly as described above, into which at least one splitter circuit is at least partially insertable from a side other than the front side of the telecommunications modules, at which contacts for connecting wires therewith are exposed. In contrast to previously known concepts, the front side is thus kept free of any components having splitter circuits. This provides the advantage that the wires connected with the module can easily be manipulated and components such as test plugs and protection components can easily be attached to the module. Since any splitter components are kept away from the front side, the reliability of the installation as a whole, i.e. both of the splitter circuit and the telecommunications lines, is improved. To allow at least the partial insertion of one or more splitter circuits from a side, other than the front side, the telecommunications module can have one or more suitable openings at a top, bottom and/or rear side.

The module can, furthermore, be open, i.e. accessible at its front side so as to allow the insertion of further components, such as protection modules and/or test plugs. Thus, these modules can be inserted into the module with one or more splitter circuits being unaffected, as these are inserted from a side other than a front side.

In particular, the module described herein can be at least partially open at its rear side so as to allow the insertion of one or more splitter circuits.

As regards a combination of a telecommunications module described herein with the above-described asymmetrical carrier, the module can have an attachment system on one side which cooperate with essentially complementary attachment system of the carrier. At the opposite side, the module can have an attachment extension, which essentially compensates for the at least partially opened side of the carrier. Thus, the module including the attachment extension and any components, which are present at the rear side of the module, can be swiveled about the attachment system without the danger of being blocked by the carrier. Thus, a highly convenient combination of at least one module with at least one carrier is provided.

Finally, as already indicated above, the assembly described herein as well as the module described above can be combined with a rack and/or cabinet, which includes the mentioned carrier, and/or a DSLAM.

BRIEF DESCRIPTION OF THE DRAWINGS

Hereinafter, the invention will be described by means of non-limiting examples thereof with reference to the drawings, in which.

DESCRIPTION OF PREFERRED
EMBODIMENTS OF THE INVENTION

Figure 1:
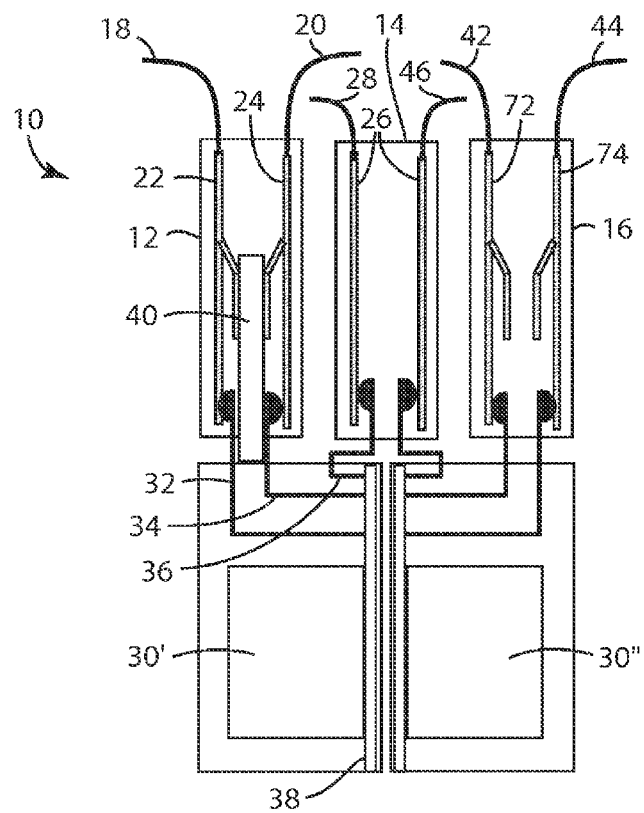
FIG. 1 shows a sectional side view of an assembly as described herein.

FIG. 1 shows, in a sectional side view, an assembly 10 as described herein comprising three telecommunications modules 12, 14 and 16. As will be described in more detail with reference to FIG. 2, wires transmitting a POTS-signal, called POTS jumpers 18, as well as wires transmitting a line signal, called line jumpers 20, are connected with the contacts 22 and 24 of a first module 12. In the embodiment shown, the wire connections are the same for the third module 16. For the third module 16, the POTS jumpers are denoted with 42, and the line jumpers are denoted with 44. In contrast, all contacts 26 of the center module 14 are adapted to transmit a DSLAM-signal and are thus each connected with a DSLAM wire 28, 46. Thus, the center module 14 could be called a DSLAM-module. In this context, the DSLAM-wires 28, 46 could also be connectable from a rear side of the module 14 (not shown). This allows an advantageous demarcation. This means that a contracting company, which is responsible for the DSLAM, is clearly separated, i.e. has their wires at the rear of the module, as compared to the wires of the telephone service provider, who has wires at the front of the module. As regards the connections between modules 12, 14 and 16, it can, furthermore, be mentioned that line jumpers 18 and 42, respectively, could be connected with DSLAM wires 28 and 46, respectively, for example, by a suitable bridge, preferably at the rear of the module, in order to provide only that service for which DSLAM connections are required.

As apparent from the lower part of FIG. 1, several splitter circuits 30', 30" are connected with the contacts 22, 24 and 26 of the modules 12, 14 and 16. In the embodiment shown, for each of the splitter circuits three contacts are visible, one of which, denoted by 32, is connected with the contact 22 transmitting the POTS-signal, the second of which, denoted by 34, is connected with contact 24 of module 12 transmitting the line signal, and the third of which, denoted by 36, is connected with contact 26 of the DSLAM-module 14 transmitting the DSLAM-signal. All contacts 32, 34, 36 are, in the embodiment shown, connected with a printed circuit board 38 of the splitter circuit, on which the necessary electrical connections are provided in order to split or combine a line-signal into or from a POTS and a DSLAM signal. The necessary electrical components, such as low pass and high pass filters, are only schematically shown. Furthermore, a first, left splitter circuit 30' and second, right splitter circuit 30" are provided as mirror images of each other. In this manner, the structure can be kept simple.

In the embodiment shown, a plug 40 is present which disconnects the splitter. In this manner, a so-called lifeline service is provided in that the POTS jumper 18 and the line jumper 20 are connected with each other via contacts 22 and 24, and POTS service alone is thus provided. Alternatively, instead of inserting the plug shown in FIG. 1, the splitter 30' could be removed and those contact areas where the plug 40 is inserted, could form a disconnection point with the contacts being biased toward each other. Thus, when the plug 40 or any other member, such as a projecting portion of the splitter circuit 30' is removed, the disconnection point could be connected and a connection between POTS-jumper 18 and line jumper 20 could be established. Also in this manner, the so-called lifeline service can be provided. As regards the DSLAM module 14, which is shown at the center of FIG. 1, this module can also have a disconnection point as described above for module 12, and which is in addition shown for module 16. Thus, while this is not specifically shown in FIG. 1, also the DSLAM module 14 can have a disconnection point, as it will be apparent to those skilled in the art with regard to modules 12 and 16.

Figure 2:
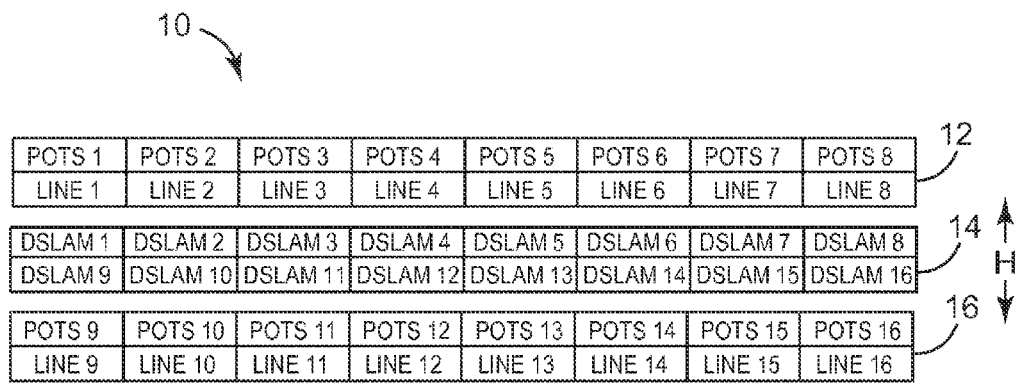
FIG. 2 shows a front view of an assembly in which the types of contacts of the modules are indicated.

It is particularly evident from FIG. 2 that all contacts of each assembly 10 of three modules are preferably utilized to achieve higher density. The contacts of all modules are arranged in parallel lines along the front side of each module. In the first module 12, a first, upper row of contacts is used for POTS jumpers of subscribers 1 to 8. A second, lower row of contacts is used for line jumpers for the very same subscribers 1 to 8. In the DSLAM module 14, the contacts of a first, upper row are used for connection with DSLAM wires of subscribers 1 to 8. The second, lower row of the DSLAM module 14 is used for the DSLAM wires of subscribers 9 to 16. Finally, the use of contacts of the third module 16 fully corresponds to that of the first module 12. Thus, with three modules 12, 14 and 16, at least having the equal number of contacts, sixteen subscribers can be served without leaving any contacts unused. This achieves a remarkably high density of components within the rack holding the arrangement 10.

It is apparent from FIG. 2 that the assembly 10 makes efficient use of the contacts, which are present, with a comparably low height H. In particular, with currently preferred modules 12, 14 and 16 constituting the assembly, the configuration of FIG. 2, i.e. one assembly, preferably has a height of approximately 45 mm. This leads to superior capacity and density. In the embodiment shown, with sixteen subscribers being served by each assembly 10, each module has two rows of contacts with sixteen contacts each. Thus, eight pairs of contacts are present in each row. Each pair of contacts transmits a POTS-, line- or DSLAM-signal.

As regards the splitter circuits visible in FIG. 1, these can be single line splitters in that they comprise three pairs of contacts, each pair being connected with three pairs of contacts of module 14 and 12 or 16, respectively. Furthermore, both splitter circuit 30' and 30" could be integrated in an integral component carrying two splitter circuits for (see FIG. 2) subscribers 1 and 9 or 2 and 10 and so on. Thus, plural single line splitters, i.e. splitter circuits which can split signals for a single line, can be integrated in an integral component which could be called a plural line splitter.

Moreover, a splitter plug as shown in a sectional view in FIG. 1, could have a certain extension in the direction perpendicular to the plane of FIG. 1, so that the splitter circuits of subscribers 1 and 2, 1 to 3 up to 1 to 8 can be integrated in a suitable plug. In other words, a single plug comprising plural splitter circuits could be used to connect plural splitter circuits with plural lines. Furthermore, all splitter circuits for subscribers 1 to 16 could be integrated in a splitter plug. Any combination of the above-described configurations are possible, such that, e.g. subscribers 1, 2, 9 and 10 are served by a splitter plug comprising four splitter circuits.

As will be apparent from the above description, the assembly described herein can comprise three modules, with the general structure of which those skilled in the art will be familiar. In particular, an assembly, which is advantageously suitable for providing voice and data transmission service, can be presented in an efficient and cost saving manner. As described above, the assembly achieves a high density of connection with a clear structure of POTS, line and DSLAM contacts, as can be taken from FIG. 2.

Figure 3:
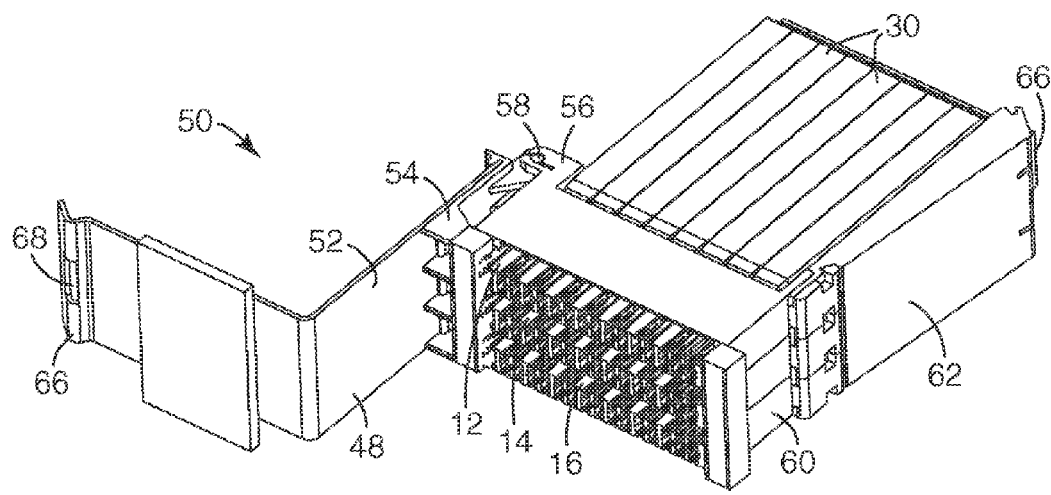
FIG. 3 shows a rear perspective view of an assembly as described herein which is swivelably mounted to a carrier.

FIG. 3 shows an assembly 10 similar to that shown in FIG. 1, which is mounted to a carrier 48 so as to be swivelable with regard to the carrier 48. Unlike most of the known carriers, the carrier 48 shown in FIG. 3 does not have a trough-like cross-section nor, as it is also known, a structure of two parallel rails or profiles, but the carrier 48 is open on one side 50 thereof. On the opposite side, a leg 52 of a generally asymmetric, L-shaped structure is provided. On this leg 52 an attachment system 54 is provided. This attachment system 54 is made of plastic. It can also be made of any other suitable material, whereas the carrier 48 can, for example, be made from metal.

The attachment system 54 cooperates with an attachment system 56, which is provided on the assembly 10. In particular, these attachment systems 54, 56 cooperate so as to allow swiveling of the assembly 10 relative to the carrier 48. In the case shown, the attachment system 54 comprises at least one axle 58, and the attachment system 56 comprises suitable openings to cooperate therewith.

As regards the assembly 10, it should be mentioned that the attachment system 56 is, in the embodiment shown, provided integral with a kind of a frame 60 which surrounds the assembly 10 of three modules. At the right and upper part of FIG. 3, plural splitter circuits 30 can be seen. In the case shown, the splitter circuits 30 are configured as single line splitters as described above. At the very right side of FIG. 3, an adapter 62 is shown, which generally forms the connection with the carrier 48 at the open side 50 thereof. In the case shown, the adapter 62 is made of plastic, and it can be made from any other suitable material. Furthermore, it is releasably, for example, by latch mechanisms, connected with the frame 60. At the rear thereof, the adapter 62 comprises a suitable structure 64 which is adapted to cooperate with an attachment structure 66 provided on the carrier 48. In the embodiment shown, the attachment structure 66 comprises an opening 68, so that the structure 64 can have a projection cooperating therewith. The projection 70 is visible in FIG. 4. It should be mentioned that the adapter 62 could be integral with the frame 60 so as to form an attachment extension as described above in connection with general explanations regarding the invention.

As can be seen from FIG. 3, the swivelable connection between the assembly 10 and carrier 48 allows swiveling of the module so as to bring the splitter circuits 30 to the front. In the normal state, the modules 12, 14 and 16 of the assembly 10 are exposed at the front, so that the splitter circuits 30 are normally not accessible. Furthermore, with a standard carrier 48, in which the splitter circuits 30 would extend between two legs, such as leg 52 shown in FIG. 3, the assembly 10 could not readily be brought in a position to do any kind of operation on the splitter circuits 30. However, with the novel, swivelable connection this is made possible. In particular, this can also be achieved for the structure shown in FIG. 3, in which the splitter circuits 30 would normally interfere with a leg, which would be provided at the open side 50 of the carrier 48. However, by providing the adapter 64, both the swiveling attachment and a stable connection of the assembly 10 with the carrier 48 is achieved.

Figure 4:
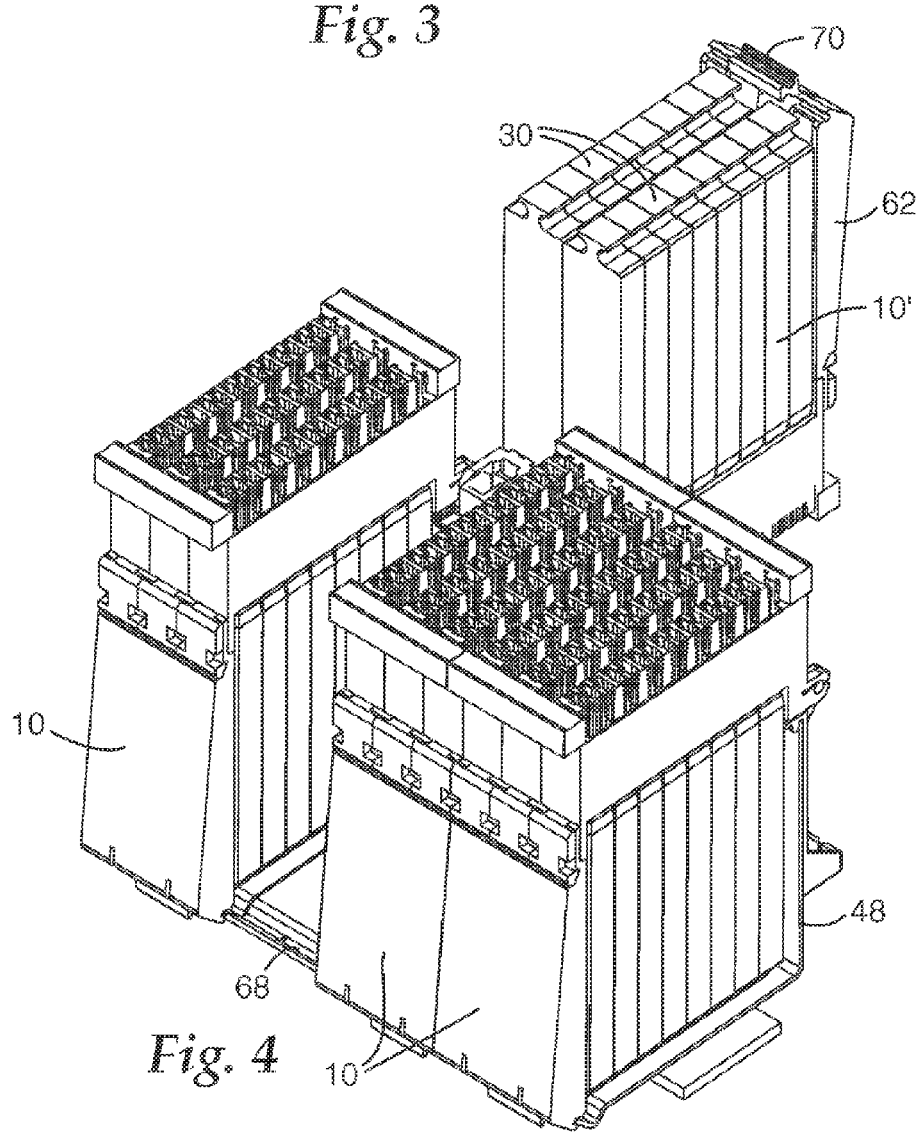
FIG. 4 shows a perspective side view of four assemblies as described herein mounted to a carrier.

In FIG. 4, three assemblies 10 are shown in the normal state. Thus, the carrier 48 is adapted to carry plural assemblies. Furthermore, also single modules can alternatively, or in addition to the assemblies 10 of FIG. 4, be attached to the carrier 48 so as to be swivelable relative thereto. One of the assemblies 10' is shown in the swiveled state, in which the splitter circuits 30 are accessible. FIG. 4 particularly shows two rows of splitter circuits 30, which correspond to the two splitters 30' and 30" of FIG. 1. Wire guides, which will be known to those skilled in the art, can be provided on the carrier 48. Furthermore, the projection 70 of the adapter 62, which is visible in FIG. 4, can be made flexible so as to allow a releasable engagement with opening 68 of the carrier 48.

The invention claimed is:

1. An assembly comprising three telecommunications modules each having an equal number of contacts for connecting wires at a front side of the modules, the assembly further comprising splitter circuits, wherein the assembly is open at a rear side and configured to receive the splitter circuits at the rear side thereof and wherein the number of splitter circuits being equal to half of the number of contacts of each module, one third of the contacts of the assembly configured to transmit a line signal, one third of the contacts of the assembly configured to transmit a POTS signal, and one third of the contacts of the assembly configured to transmit a DSLAM-signal.

2. The assembly according to claim 1 wherein all contacts of one module are adapted to transmit DSLAM-signals.

3. The assembly according to claim 2 wherein the module having contacts all of which are adapted to transmit a DSLAM-signal is arranged between the two other modules.

4. The assembly according to claim 1 wherein half of the contacts of at least one module are adapted to transmit a line signal and a remaining half of the contacts of this module are adapted to transmit a POTS signal.

5. The assembly according to claim 1 wherein the splitter circuit has three pairs of two contacts which are connected with the contacts of the telecommunications modules.

6. The assembly according to claim 1 further comprising at least one carrier, the modules being attachable to the carrier and adapted to allow swiveling of the modules with regard to the carrier.

7. The assembly according to claim 6 wherein the carrier is at least partially open at a side opposite the attachment to the carrier.

8. The assembly according to claim 6 further comprising an adapter at the least partially open side of the carrier which connects the module with the carrier.

9. The assembly according to claim 1 in combination with a rack or a cabinet, which includes the carrier.

10. The assembly according to claim 1 in combination with a DSLAM.

11. The assembly according to claim 1 wherein the assembly is swivelably connected to the carrier by an attachment system.

12. The assembly according to claim 11 further comprising an attachment extension at a side opposite the attachment system of the module.

13. The assembly according to claim 12 further comprising one or more splitter circuits attached to the rear side of the assembly.

14. The assembly according to claim 13 wherein the splitter circuits are arranged in two rows and disposed in a mirror image arrangement.

15. The assembly of claim 1 further comprising one of a test plug and a protection module inserted into a module on the front side of the assembly.

\* \* \* \* \*

UNITED STATES PATENT AND TRADEMARK OFFICE
CERTIFICATE OF CORRECTION

PATENT NO. : 7,844,049 B2  Page 1 of 1
APPLICATION NO. : 10/598929
DATED : November 30, 2010
INVENTOR(S) : Gaetan Perrier It is certified that error appears in the above-identified patent and that said Letters Patent is hereby corrected as shown below:

Title Page,
After Item [65], Prior Publication Data, please insert the following:
Item -- [30], Foreign Application Priority Data
   March 18, 2004   (European Patent Office)   04006530.2 --

Signed and Sealed this
Fifteenth Day of March, 2011

David J. Kappos
*Director of the United States Patent and Trademark Office*